(No Model.)
J. CHALFANT.
CULTIVATOR.
No. 359,242. Patented Mar. 15, 1887.
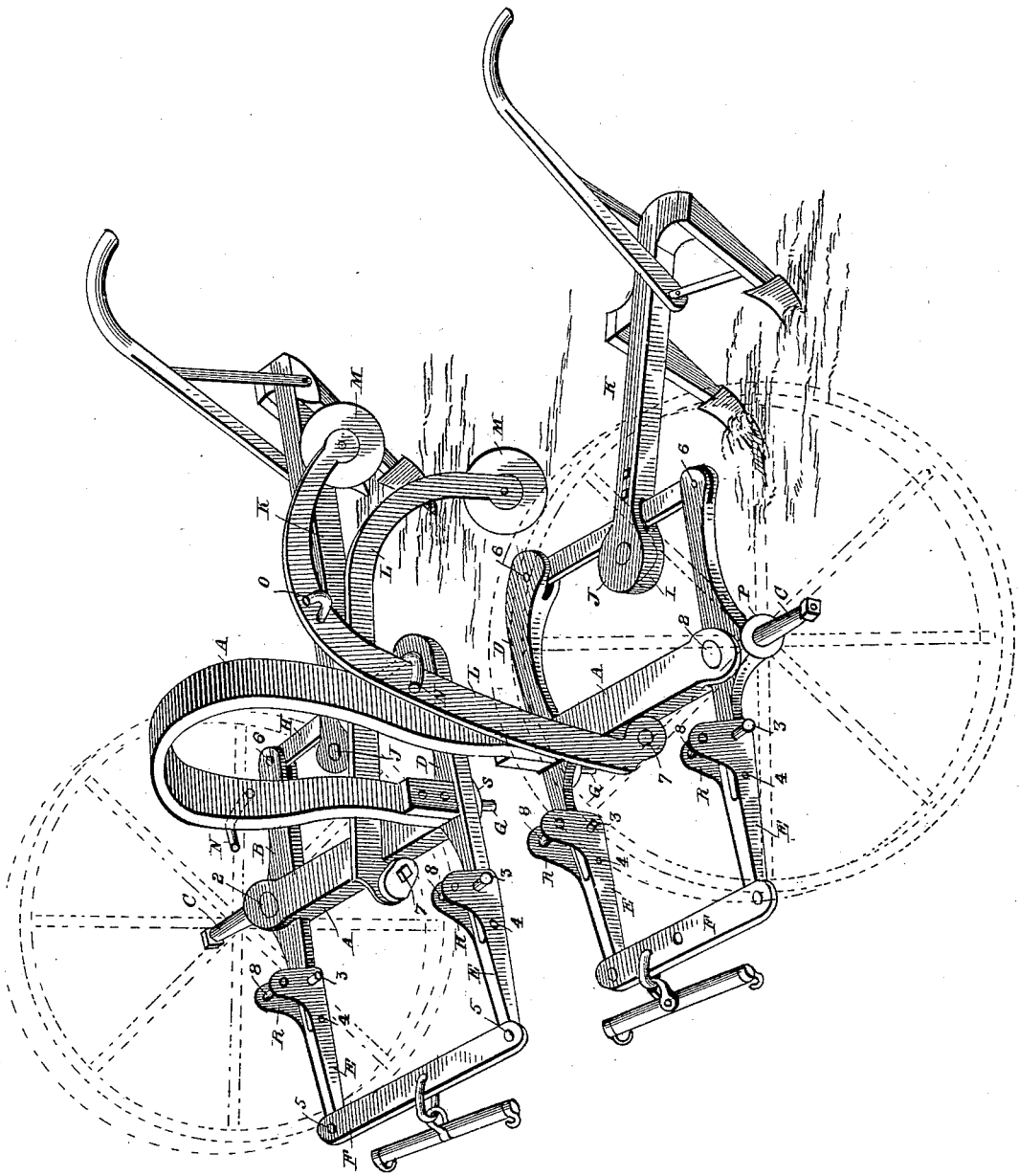
Witnesses
Edwin L. Yewell.
Wm. F. Huntemann.
Inventor
Johnathan Chalfant,
By his Attorney
Charles E. Adamson.

UNITED STATES PATENT OFFICE.

JONATHAN CHALFANT, OF BLUNTSVILLE, INDIANA.

CULTIVATOR.

SPECIFICATION forming part of Letters Patent No. 359,242, dated March 15, 1887.

Application filed September 27, 1886. Serial No. 214,710. (No model.)

*To all whom it may concern:*

Be it known that I, JONATHAN CHALFANT, a citizen of the United States, residing at Bluntsville, in the county of Henry and State of Indiana, have invented a new and useful Improvement in Cultivators, of which the following is a specification, reference being had to the accompanying drawing, which forms a part of this specification.

My invention relates to cultivators used for cultivating corn, &c.; and the objects of my invention are to construct a cultivator so that it will be very easily managed, and one that will be strong and durable. I attain these objects by the mechanism illustrated by the accompanying drawing, in which similar letters and figures refer to similar parts throughout.

The axle A is made with two lugs, P, on each outer end, so that the spindle-bar B can be pivoted between the lugs by a bolt, 2, all as shown. The said axle is bent up in the center, forming an arch, and provided with a lug, S, and pin G at the lower part of the said arch, which forms a pivot for the inside bars, D, all as shown. The rear ends of the said bars B and D are provided with lugs, so that the round rod H, flattened at each end, connects the two bars together, as shown in the drawing. The forward ends of the bars B and D are pivoted to the bars E by pivots 4 between the lugs R, and the forward ends of the said bars E are flattened and pivoted between two draft-bars, F, which are placed parallel to each other, and to which the horses are attached, as indicated by the drawing. The bars B are provided with spindles C, to which the wheels of the cultivator are attached. The traveler-wheels M are secured to the curved bars L, which are pivoted to the axle A by a bolt or pivot, 7, so that they can be raised up and hooked over the hook N or let down on the ground to carry the plows when the latter are not in use or when it is desired to raise and hold the plows out of the ground. When the traveler-wheels are let down on the ground, the plows are raised up until the beam K will rest on the hook O.

The drawing shows one of the wheels let down in use and the other raised up and resting on the hook N.

In all plows heretofore constructed the plow-beams K have been in some way pivoted or hinged to the axle, so that the forward ends of the said beams could not move laterally, and in my invention I overcome this and avoid all side draft by allowing the beams to work laterally. By the pulley-wheel I, working in the holder J, the pulling of the plows all comes direct on the said wheels, which allows the said plows to move sidewise very easily, as the wheel works freely on the rod H. This is the most important feature of my invention, as the shovels are made to run a regular distance from the corn all the time, regardless of the variation in the rows or of the team not being properly guided. The rod H remains at all times parallel with the axle A, as the arms B and D being pivotally connected together by the draft-bars F and to the said rod H, the whole mechanism will work on the pivots P and G. The wheels being secured to the spindles C, which are rigid with the bars B, the plow is very easily guided and it will make very short turns. The depth of the plowing is regulated by the elevation of the bars E.

In the drawing the bars E are shown set in line with the bars B and D by the pin 3 being placed in the lower holes in the lugs, as shown. In this way the plows will run as deep as desired, and by setting the pins 3 through the bars B and D and through the upper holes, 8, in the lugs the draft-bars F will be elevated, which when pulled on by the team will cause the rods H to be elevated, thereby raising up on the plow-beams and causing the plow to run shallow.

By making the rear ends of the bars D a little longer than the rear ends of the bars B the plows will move outward more easily, or by making the bars B the longest they will move inward more easily.

Having thus described my invention, I claim the following, and desire to secure the same by Letters Patent:

1. In a cultivator, the combination, with an axle, of bars B D, pivotally connected therewith, and pivotally connected at their ends by the bars F H, the bar B having a spindle, C, substantially as described.

2. The combination, with the axle A, of the bars B D, pivotally connected therewith, the bars E, pivotally connected with the forward ends of the bars B D, and the bar F, pivotally connected with the bar E, substantially as described.

3. The combination, with the axle A, of the bars B D, pivotally connected therewith, the bars H, pivotally connecting the bars B D, and the cultivator having a pulley to travel on said bar, substantially as described.

4. The combination, with the axle A, of the bars B D, pivotally connected therewith, the bars E, pivotally connected with the forward ends of the bars B D, the bars F, connecting the bars E, the bar H, connecting the bars B D, and the cultivator, having the pulley to travel on said bar, substantially as described.

5. The combination, with the arched axle A, having the hook N, of the pivoted bar L, having the wheels M, and the hook O, substantially as described.

JONATHAN CHALFANT.

Witnesses:
A. L. WRIGHT,
F. B. POLK.